(12) United States Patent
Colvig et al.

(10) Patent No.: US 8,438,303 B2
(45) Date of Patent: May 7, 2013

(54) AUDIT LOGGING AND ROLE BASED SECURITY USING ONE WAY PROXY ARCHITECTURE

(75) Inventors: Arthur J. Colvig, Beaverton, OR (US); Timothy J. Crawford, Beaverton, OR (US); Krishna Harathi, Portland, OR (US); Martine B. Wedlake, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/173,065

(22) Filed: Jul. 15, 2008

(65) Prior Publication Data

US 2010/0017536 A1    Jan. 21, 2010

(51) Int. Cl.
*G06F 15/173*    (2006.01)
*G06F 11/00*    (2006.01)

(52) U.S. Cl.
USPC ........................................ 709/238; 370/225

(58) Field of Classification Search .................. 709/238; 370/225–228
See application file for complete search history.

(56) References Cited

U.S. PATENT DOCUMENTS

| | | | |
|---|---|---|---|
| 6,341,317 B1 | 1/2002 | D'Errico et al. | |
| 6,374,248 B1 * | 4/2002 | Nazari | 1/1 |
| 6,687,732 B1 * | 2/2004 | Bector et al. | 709/200 |
| 7,032,071 B2 | 4/2006 | Hand et al. | |
| 2002/0114332 A1 * | 8/2002 | Apostolopoulos et al. | 370/392 |
| 2003/0037041 A1 * | 2/2003 | Hertz | 707/1 |
| 2003/0046335 A1 | 3/2003 | Doyle et al. | |
| 2003/0221051 A1 | 11/2003 | Hand et al. | |
| 2004/0246979 A1 * | 12/2004 | Klaghofer et al. | 370/401 |
| 2005/0021689 A1 | 1/2005 | Marvin et al. | |
| 2005/0027693 A1 * | 2/2005 | Yagawa | 707/3 |
| 2005/0185587 A1 * | 8/2005 | Klinker | 370/237 |
| 2006/0223524 A1 * | 10/2006 | Ginzburg | 455/424 |
| 2006/0248582 A1 | 11/2006 | Panjwani et al. | |

\* cited by examiner

*Primary Examiner* — Jeong S Park
(74) *Attorney, Agent, or Firm* — Lieberman & Brandsdorfer, LLC (57) ABSTRACT

A method and apparatus are provided for managing logging data communications in a computer system. The computer system is configured with a proxy agent in communication with a client machine and storage, and an embedded agent in communication with the proxy agent and the client machine. All inbound communications from the client machine to the storage are maintained in a log local to the proxy agent. However, all outbound communications are split between two different communications paths, with one outbound path from the storage directly to the client machine and a second outbound path from the storage to the client machine via the proxy agent. One of the two outbound paths is selected based upon one or more of the characteristics of the associated communication.

16 Claims, 6 Drawing Sheets

AUDIT LOGGING AND ROLE BASED SECURITY USING ONE WAY PROXY ARCHITECTURE

BACKGROUND OF THE INVENTION

1. Technical Field

This invention relates to managing data communication in a distributed computer system. More specifically, the invention relates to agents for logging data communication for audit and security measures and selecting different communication paths based upon these measures.

2. Description of the Prior Art

Figure 1:
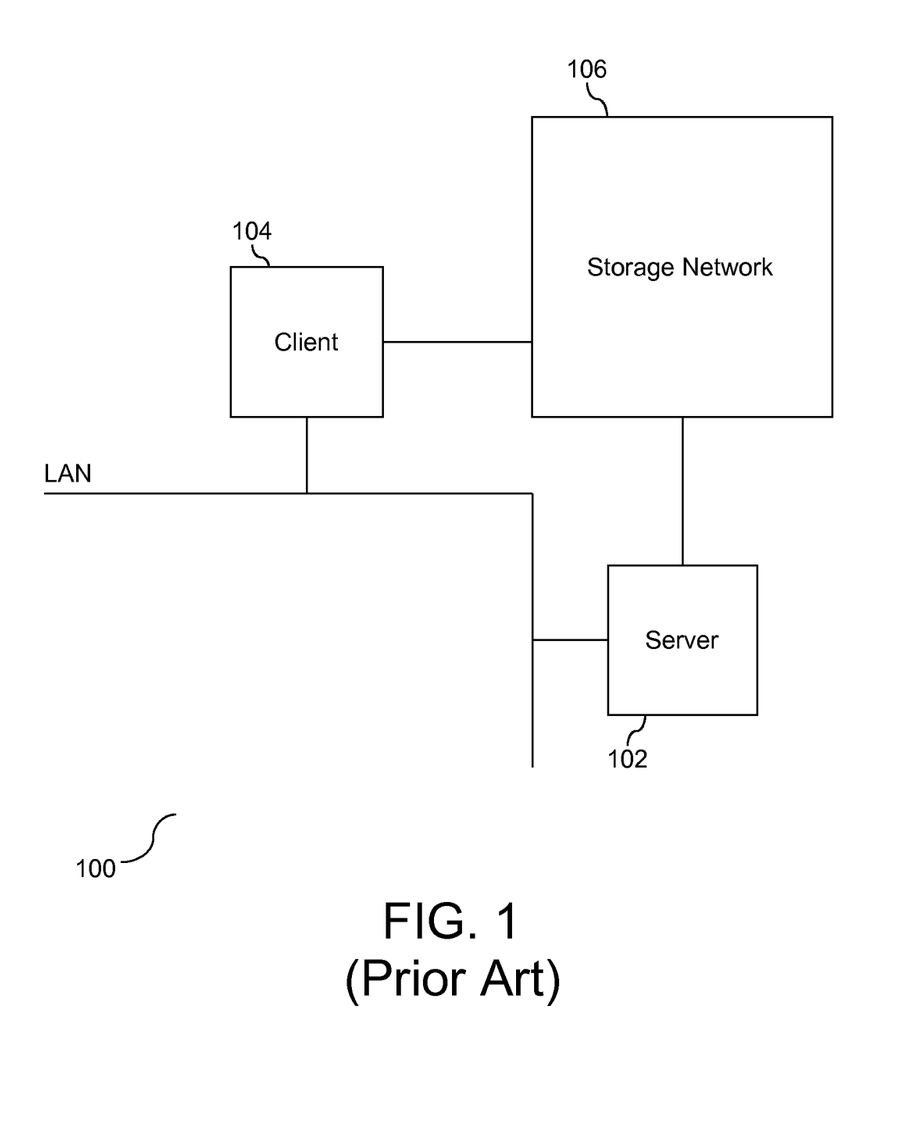
FIG. 1 is a block diagram of a prior art distributed computer system.

In a distributed computer system with shared persistent storage, one or more client machines are in communication with data storage through one or more server nodes. FIG. 1 is a prior art block diagram (100) illustrating one example of a distributed computer system. As shown in this example, there is one server node (102), one client machine (104), and a storage network (106). The storage network (106) may include one or more storage devices (not shown). The client machine (104) may access an object or multiple objects stored on file data space of the storage network (106). In opening the contents of an existing file object on the file data space of the storage network (106), the client (104) contacts the server node to obtain metadata and locks. Metadata supplies the client with information about a file, such as its attributes and location on the storage device(s). Locks supply the client with privileges it needs to open a file and read or write data. The server node (102) performs a look-up of metadata information for the requested file within the metadata space of the storage network (106). The server node (102) communicates granted lock information and file metadata to the requesting client machine (104), including the location of the data blocks making up the file. Once the client machine (104) holds a distributed lock and knows the data block location(s), the client machine (104) can access the data for the file directly from a shared storage device attached to the storage network (106).

Figure 2:
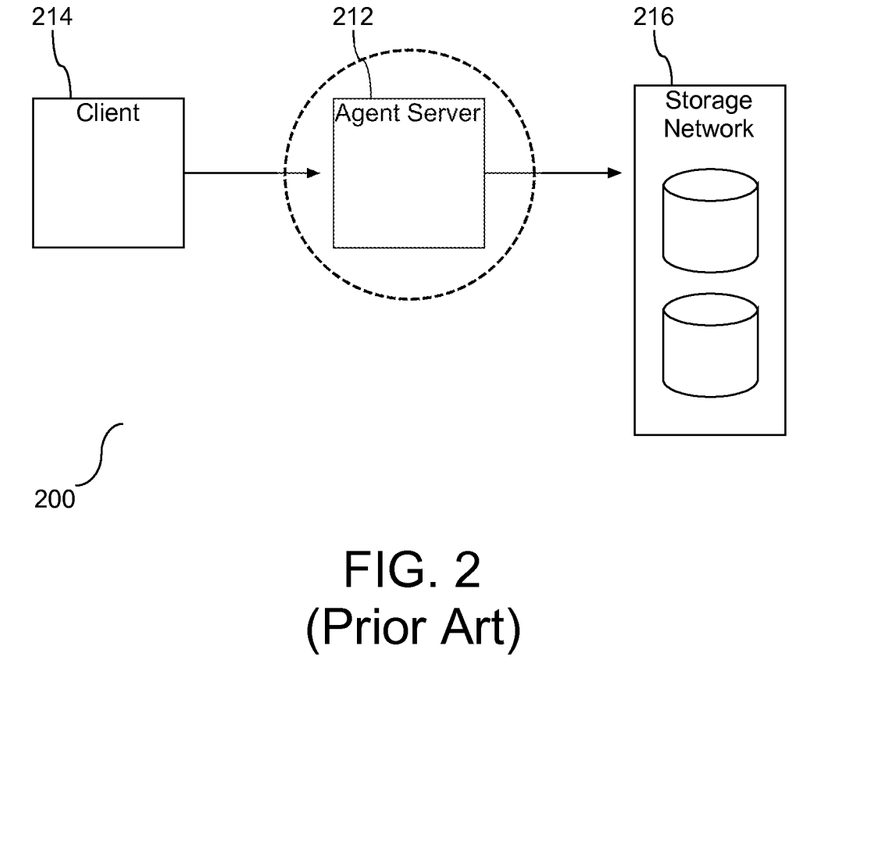
FIG. 2 is a block diagram of a prior art distributed computer system with a proxy agent.

An agent may be an application that initiates a request to a storage device or a data storage server from a requesting client. In one embodiment, the agent is in the form of an application programming interface (API) that manages storage and initiates a request to a device or a data storage server. FIG. 2 is a prior art block diagram (200) of the distributed system of FIG. 1 showing a client machine (214) in communication with a storage network (216) via a server (212), wherein the server (212) is a proxy agent server with an agent residing thereon. In computer systems, a proxy agent server is a server, computer system, or an application program, which services the requests of its clients by forwarding the request to the intended recipient. As shown herein, all traffic between the client machine (214) and the storage network (216) feeds through the proxy agent server (212), including communication between the client and the server, and communications between the server and the storage network (216). In one embodiment, the proxy agent server (212) maintains an audit log of all client transactions with the storage network (216). Since all management traffic feeds through the proxy agent server (212), this is an appropriate location for an audit log or a role based security repository. However, there are shortcomings associated with the proxy model, including added complexity to deployment, delays, and creation of a bottle neck for time-sensitive data to be communicated from the storage network (216). All network traffic to the storage network (216) passes through the proxy agent server (212). Accordingly, there are limitations associated with the proxy based agent server.

Figure 3:
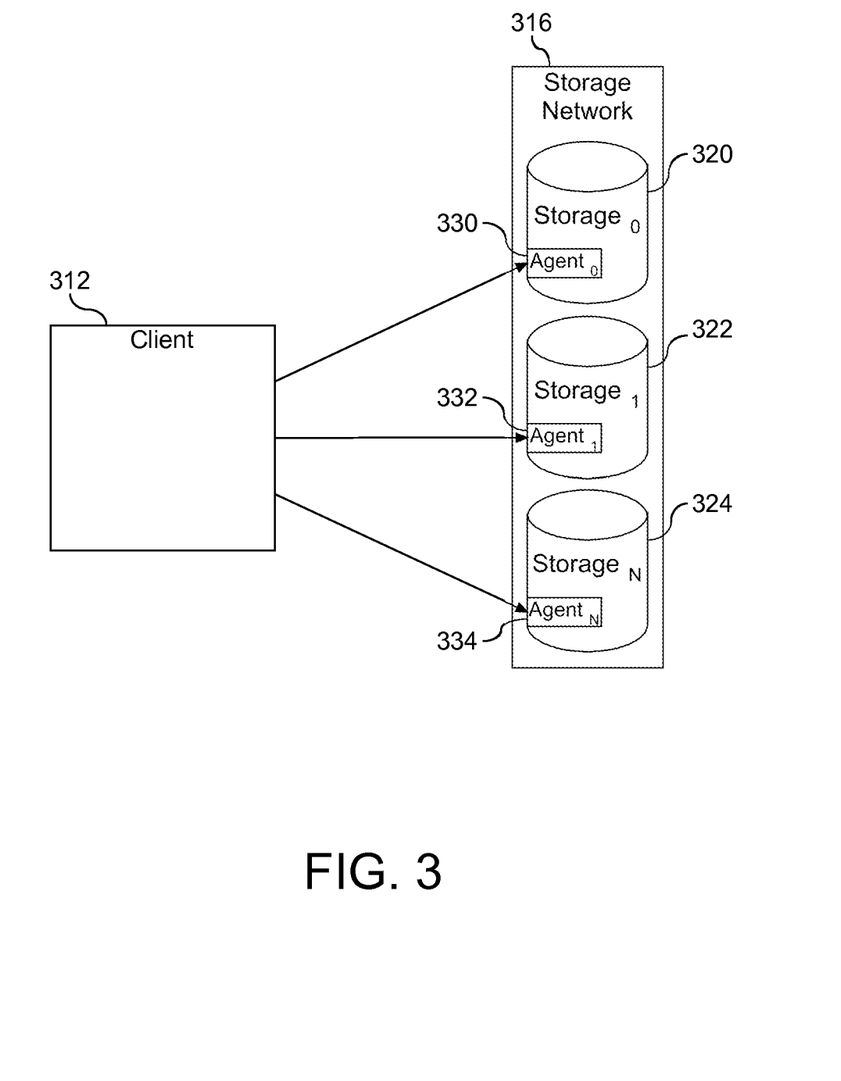
FIG. 3 is a block diagram of a prior art distributed computer system with an embedded agent.

One solution to the limitations of the system shown in FIG. 2 is known in the art as an embedded model wherein the agent is embedded within a storage device in a storage network. In other words, the agent is removed from the server and placed within one or more storage devices. FIG. 3 is a prior art block diagram (300) of a distributed computer system with a client machine (312) in communication with individual agents of storage devices in a storage network (316). As shown, the storage network (316) has N number of storage devices (320), (322), and (324). Each storage device in the storage network (316) has a separate embedded agent. More specifically, as shown, storage device (320) has embedded agent (330), storage device (322) has embedded agent (332), and storage device (324) has embedded agent (334). The client machine (312) may communicate with each embedded agent, but each embedded agent can only communicate with its associated local storage device. Each separate embedded agent (330), (332), and (334) includes the functionality to store audit log data and a role based security repository as in the proxy model shown in FIG. 2. The embedded model mitigates the primary shortcomings of the proxy model by moving the agent to a different location within the network. However, there are issues with the location of the embedded agents (330), (332), and (334) and innate constraints within the storage device (316). In practice, it is not feasible to store extensive logs or role based repositories inside the individual storage devices (320), (332), and (334), and such logs would only represent a specific device's view of the overall storage network activity. By embedding the agents (330), (332), and (334) within the respective storage devices (320), (322), and (324), there is also an added cost to each storage device in a storage network. Furthermore, there is no security associated with the agent, as provided by the proxy model where the agent is embedded in the server. Although the embedded model mitigates some of the shortcomings of the proxy model, issues remain that affect the functionality of the agent within the network structure.

Therefore, there is a need for employing an agent within a distributed system that solves the problems associated with the existing solutions.

SUMMARY OF THE INVENTION

This invention comprises a method and system for auditing communications to a storage device via a proxy agent and an embedded agent, and selecting one or two communication paths for transmitting return data to a requesting client.

In one aspect of the invention, a method is provided for managing data communication in a computer system. A return data communication path from a storage network is split into two optional paths. A first return path is provided through a first agent embedded in the computer system, and a second path separate from the first agent. The first and second agents are synchronized to negotiate an optimal return communication path between the two paths. One of the return paths to the client is selected in response to the negotiation.

In another aspect of the invention, a computer system is provided with a processor in communication with a proxy agent, and a storage device in communication with the proxy agent. The embedded agent is local to the storage device. An inbound data request is communicated to the storage device. Two optional return communication paths are provided from the embedded agent. The proxy agent and the embedded agent synchronize and negotiate an optimal return communication path from the storage device. Following the negotiations, one of the return communication paths is selected.

In yet another aspect of the invention, an article is provided with a computer readable carrier including computer program instructions configured to manage duplicate copies of data. Instructions are provided to split a return communication path from a storage device into a first path through a first agent embedded in a computer system, and a second path. Instructions are provided to synchronize the first and second agents to negotiate an optimal return communication path. One of the return paths is selected based upon the negotiation.

In an even further aspect of the invention, a method is provided for managing data communication in a computer system. A return communication path is split into two paths from a storage device. A first path is from the storage device through a first agent embedded in a first computer system; and a second path is direct from the storage device to a requesting computer system. The first computer system and the requesting computer system are separate systems. The first agent and second agent are synchronized to negotiate an optimal return communication path between one of the two paths. The negotiation includes combining logic of the first and second agents for providing a uniform decision between the two agents. Based upon the synchronization, one of the return paths is selected in response to the negotiation.

Other features and advantages of this invention will become apparent from the following detailed description of the embodiment(s) of the invention, taken in conjunction with the accompanying drawings.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but merely be representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiment of the invention will be best understood by reference to the drawings, wherein like parts are designated by like numerals throughout. The following description is intended only by way of example, and simply illustrates certain select embodiments of devices, systems, and processes that are consistent with the invention as claimed herein.

Overview

The method, apparatus, and article of manufacture of the present invention provides valuable advantage over the prior art. According to the present invention, the proxy model and the embedded model are employed together with a bifurcated communication system. As in the proxy model, communications from the client machines are transmitted to the storage network through an agent proxy. This enables the agent proxy to maintain a log of all incoming communications. However, the return communication path from the data storage to the client machines are bifurcated, in that there are at least two communication paths available for outgoing communications from the storage network to the client. One path is to communicate data to the requesting client through the agent embedded in the server. A second path is to communicate data to the requesting client directly from network storage. Synchronization of and communication between the proxy agent and the embedded agent are employed together with criteria of the bifurcated communication system to determine one of the communication paths for the data. Various static and dynamic analysis, such as status of an alternate agent, nature of requesting client, and type of data request, are used by the agents in making the decision on which communication path to use for the data response. The selection criteria enables data requiring the benefits of the proxy based agent server to be retained, while allowing data that does not have these restrictions to obtain the benefit of the agent embedded model. Accordingly, employment of a bifurcated communication system supports selection of an optimal communication path in conjunction with maintaining a log of all incoming communications.

Technical Details

In the following description, reference is made to the accompanying drawings that form a part hereof, and which is shown by way of illustration that specific embodiment in which the invention may be practiced. It is to be understood that other embodiments may be utilized because structural changes may be made without departing from the scope of the present invention.

Figure 4:
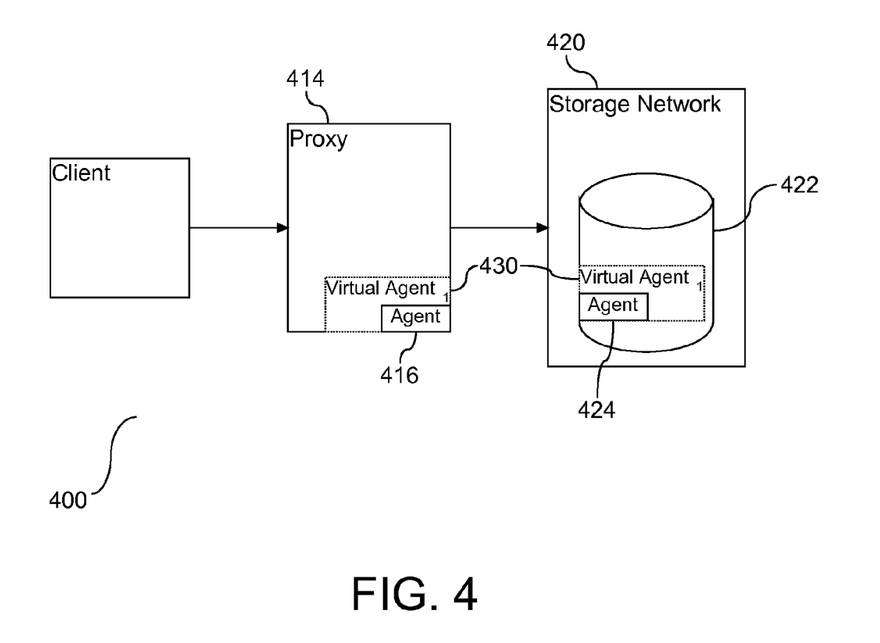
FIG. 4 is a block diagram of a modified distributed computer system that morphs the proxy model with the embedded models according to the preferred embodiment of this invention, and is suggested for printing on the first page of the issued patent.

FIG. 4 is a block diagram (400) of a modified distributed computer system that morphs the proxy model with the embedded model to take advantage of the benefits of both structures. As shown, the system includes at least one client machine (410) in communication with a storage network (420) through a proxy (414). The proxy (414) includes an embedded agent (416), and is hereinafter referred to as a proxy agent (416). The proxy agent (416) maintains an audit log of all client transactions requesting data from the storage network (420). Accordingly, all network traffic from the client machine (410) to the storage network (420) may pass through the proxy agent (416).

In addition, the storage network (420) may also include an agent (424) embedded in a storage device (422). The embedded agent (424) and the proxy agent (416) are not independent entities, but work together in conjunction as one virtual common agent (430). In one embodiment, each storage device in a storage network has a separate embedded agent. The embedded agent (424) includes the functionality to store audit log data and role based security repository. Accordingly, as shown, the agents are embedded in at least two locations in the distributed computer system, including the proxy (414) and the individual storage device(s) (422).

Figure 5:
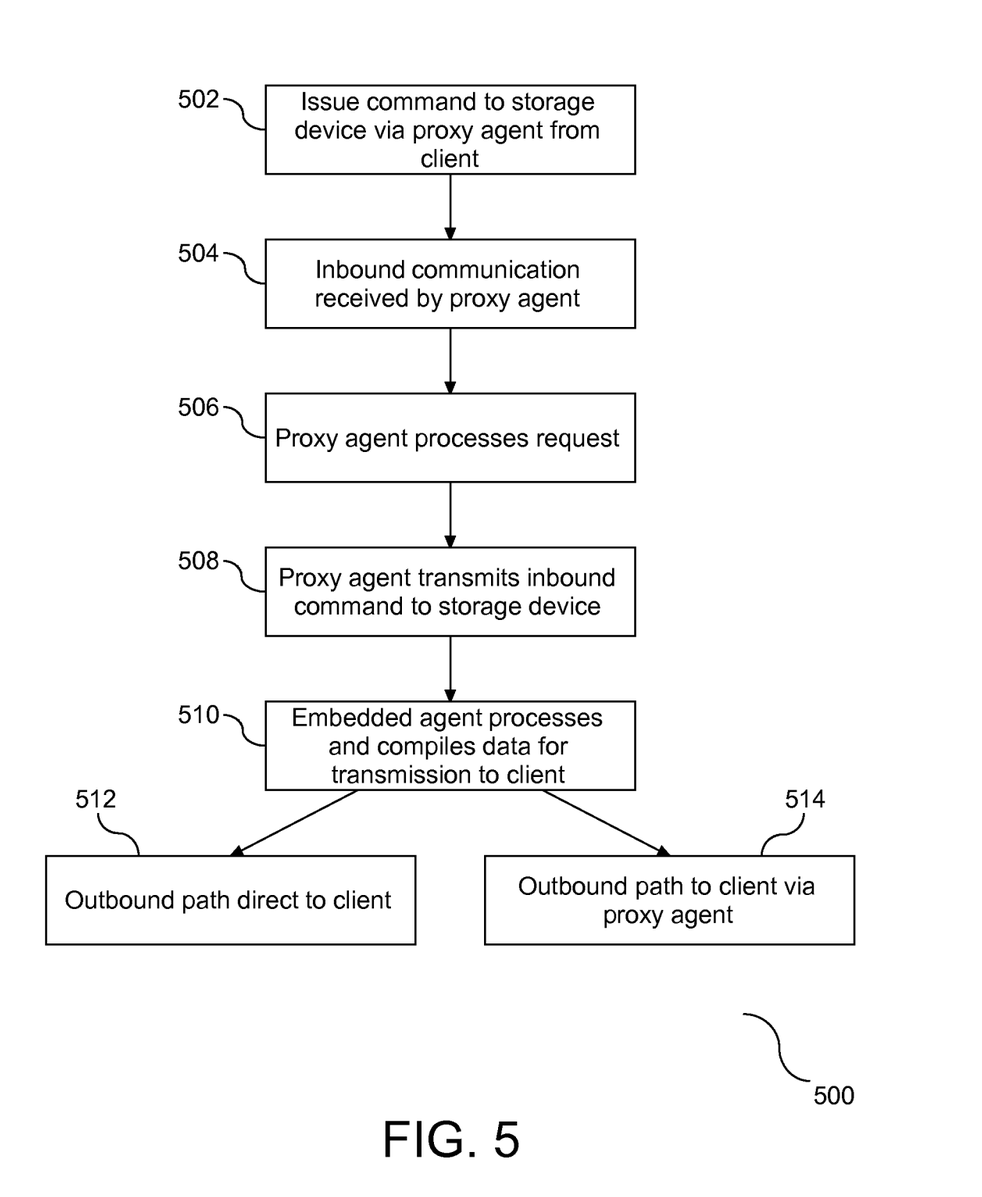
FIG. 5 is a flow chart addressing the bifurcation of data communication in the combined proxy model and embedded model in the system shown in FIG. 4

FIG. 5 is a flow chart (500) addressing the bifurcation of data communication in the combined proxy model and embedded model in the system shown in FIG. 4. As described above, a request for data is initiated with a client machine and a command is issued to the appropriate storage device via a proxy agent (502). The command at step (502) is also known as an inbound command or inbound data request, hereinafter referred to as an inbound communication. All inbound communications are received by the proxy agent (504), which processes the request (506). Processing of an inbound communication may include placing the inbound communication in a log for security administration. The proxy agent transmits the inbound command to the storage device (508). The proxy agent may communicate with the storage device to obtain metadata and locks for the requesting client and to communicate granted lock information and file metadata to the requesting client machine, including the location of the data blocks making up the file. Accordingly, the inbound communication is initiated by the client, logged into the proxy agent, and communicated to the appropriate storage device.

Once the data request is processed, the requested data is compiled for transmission to the requesting client (510). Communication of the data request to the client machine is hereby referred to as an outbound communication. The outbound communication is split into two separate and distinct paths. One path is directly from the storage device to the requesting client, and a second path is an indirect path from the embedded agent to the client via the proxy agent. Each reply to a data request has the option of selecting one of the two available communication paths to the client. As noted above, the proxy agent (416) and the embedded agent (424) are both a part of a single virtual agent. The two agents (416) and (424) operate under the auspices of the virtual agent (430) using combined logic to decide a return communication path. The virtual agent ensures that the two agents communicate and agree on criteria for path selection and adapt their behavior based upon the operation and agreement. Accordingly, for each data request a selection mechanism is employed to determine an optimal data reply path based upon characteristics associated with the request and/or the data reply.

The proxy agent and the embedded agent are synchronized to arbitrate and select the optimal communication path for the outbound communication (510). The synchronization and arbitration requires an intelligent path selection decision. The arbitration may take different forms based upon different selection criteria. In one embodiment, the arbitration may be based upon the network traffic, wherein the path selection will be based upon the path with the bandwidth available to process the outbound communication. Similarly, in one embodiment, the arbitration may be command dependent. More specifically, some inbound communications are classified as passive, wherein the audit and/or security concerns are minimal, and other inbound communications are classified as active, wherein there are audit and/or security concerns. Outbound passive communications are processed directly from the storage device to the requesting client, and outbound active communications are processed to the requesting client via the proxy agent. In another embodiment, the outbound communication path may be selected based upon the command, wherein the characteristics of the command will determine the path. Similarly, in one embodiment, inbound communications of a select client machines may pre-select a specific path for the outbound communication. Accordingly, regardless of the criteria employed, one of the communication paths is selected for the outbound communication, including a direct path from the embedded agent of the storage device to the requesting client (512) and an indirect path from the embedded agent through proxy agent to the requesting client (514).

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

Figure 6:
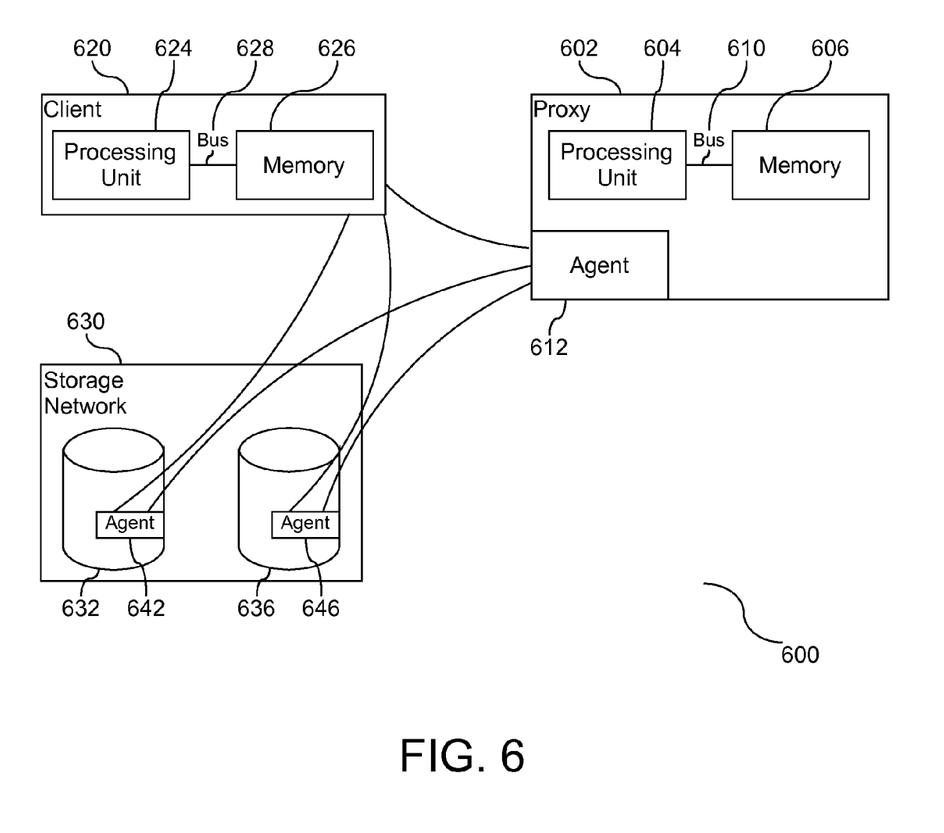
FIG. 6 is a block diagram illustrating placement of a management tool for an outbound communication in a computer system.

FIG. 6 is a block diagram (600) illustrating placement of a management tool for an outbound communication in a computer system. The illustration shows a proxy (602) with a processor unit (604) coupled to memory (606) by a bus structure (610). Although only one processor unit (604) is shown, in one embodiment, the proxy (602) may include more processor units in an expanded design. The proxy includes an agent (612) embedded therein. The agent (612) is in communication with both a client machine (620) and a storage network (630) across a network (not shown). The client machine (620) is shown with a processor unit (624) coupled to memory (626) by a bus structure (628). The storage network (630) is shown with two separate storage devices (632) and (636). Each storage device is provided with an embedded agent (642) and (646), respectively. As such, storage device (632) has embedded agent (642) and storage device (636) has embedded agent (646). Although only two storage devices are shown herein, the invention should not be limited to the quantity of storage devices in the network. As shown herein, the proxy agent (612) is in communication with each embedded agent in the storage network (630).

The proxy agent (612) is synchronized with each embedded agent (642) and (646). All outbound communications from the embedded agents (642) and (646) are arbitrated with the proxy agent (612) to select a direct or indirect communication path. Selection of the optimal return path is based on criteria local to the communication. The return path may be direct from an explicit command embedded with the data request from the client, or an implicit analysis of the data request. In one embodiment, a filter mechanism (not shown) may be embedded local to the client to review all outbound communications as an element for arbitrating a return communication path. Similarly, in one embodiment, the filter mechanism may be placed between the client and the agent. More specifically, all inbound communications are received and processed by the proxy agent (612). In one embodiment, the proxy agent (612) utilizes instructions in a computer readable medium to maintain a log (not shown) for all communications received from the client (620) and all communications transmitted from the proxy agent (612) to the client (620). Similarly, in one embodiment, each embedded agent (642) and (646) of the storage network (630) maintains a log (not shown), with the log maintained local to the individual storage device. The logs maintained by the respective agents are in the form of audit logs and/or role based security to control. More specifically, the logs track which client machines are driving storage management operations. Accordingly, the logs enable oversight of communications in the network between the client machine and the individual storage devices in a storage network.

In one embodiment, the proxy agent (612) and the embedded agents (642) and (646), respectively, may reside in memory local to the proxy (602) and the local storage device (632) and (636), respectively. However, the invention should not be limited to this embodiment. In one embodiment, the proxy agent (612) and the embedded agents (642) and (646) may reside as a hardware tool external to local memory, or it may be implemented as a combination of hardware and software. Accordingly, the agents may be implemented as a software tool or a hardware tool to facilitate mediation and auditing management of communications between the client machine and the storage device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Employment of separate agents on both the proxy and the storage device opens up at least one optional communication path for all outbound communications. All inbound communications are managed by the proxy agent, and a log of the transmission is maintained local to the proxy agent. However, the proxy agent and the embedded agent are synchronized to mediate a selection of an optimal return path for the outbound communication. Selection of the optimal return path is based on criteria local to the communication. The return path may be directly from an explicit command embedded with the data request from the client, or an implicit analysis of the data request. The bandwidth available to other inbound communications is increased by selecting the direct return path, as there is no outbound communication transmitting along the same return path. Accordingly, benefits associated with audit and security concerns of the proxy model are maintained, together with the efficiency of the embedded model.

Alternative Embodiments

It will be appreciated that, although specific embodiments of the invention have been described herein for purposes of illustration, various modifications may be made without departing from the spirit and scope of the invention. In particular, in one embodiment, the synchronization between the proxy agent and the embedded agent may be removed. By removing the synchronization, a set of pre-set rules may be employed to govern the return path for the data communication. Accordingly, the scope of protection of this invention is limited only by the following claims and their equivalents.

We claim:

1. A method for managing data communication in a computer system, comprising:
    providing a client machine and a server in communication with a data storage device;
    said client machine sending a data request to said data storage device through said server;
    splitting a return communication path from said storage device into a first path through a first agent embedded in said server, and a second path communicating said requested data to said client directly from said storage device;
    synchronizing said first agent in communication with a second agent, said second agent embedded in said storage device, to communicate and negotiate an optimal return communication path between one of said two paths based upon criteria local to said requested data, wherein the first and second agents form a single virtual agent, wherein the step of selectins the return path is based upon a command defining the return path, the command embedded within the data request; and
    selecting one of the return paths in response to the negotiation.

2. The method of claim 1, further comprising maintaining a first log of network traffic through the computer system with the first agent, and maintaining a second log of network traffic through the second agent.

3. The method of claim 1, further comprising classifying a data access request with a characteristic of the data, and wherein the step of selecting one of the return paths is based upon the classification.

4. The method of claim 3, wherein the step of classifying the data access request includes the second agent classifying the request, including a passive request for a data request absent a security concern, and an active request for a data access request with a security concern.

5. The method of claim 1, further comprising selecting the optimal return communication path based upon a performance requirement.

6. A computer system, comprising:
- a client machine and a server in communication with a data storage device;
- first agent embedded with the server;
- a second agent local to the storage device, said second agent in communication with the first agent;
- an inbound data request from said client machine communicated to the storage device through said server;
- two optional return communication paths from the storage device including a first path to communicate said requested data through said first agent and a second path to communicate said requested data to said client directly from said second agent; and
- an optimal return communication path from the storage device selected in response to a negotiation between the first agent and the second agent, the negotiation based upon criteria embedded with the requested data, wherein the first and second agents form a single virtual agent; and
- selection of the return path based upon a command defining the return path, the command embedded within the data request.

7. The system of claim 6, further comprising a first log of network traffic maintained local to the first agent, and a second log of network traffic maintained local to the second agent.

8. The system of claim 6, further comprising a classification assigned to the data request based upon a characteristic of the data, wherein one of the return communication paths is selected based upon the assigned classification.

9. The system of claim 8, wherein said classifications includes a passive request for a data request absent a security concern, and an active request for a data request with a security concern.

10. The system of claim 6, further comprising selection of one said return paths based upon performance requirements.

11. An article comprising:
- a computer readable carrier including computer program instructions configured to manage duplicate copies of data, the instructions comprising:
  - instructions to provide communications between a client machine and a server and a data storage device;
  - instructions to send a data request from said client machine to said data storage device through said server;
  - instructions to split a return communication path from a said storage device into a first path through a first agent embedded in said server, and a second path communicating said requested data to said client directly form said storage device;
  - instructions to synchronize the first and second agents, said second agent local to said storage device, to communicate and negotiate an optimal return communication path between one of the two paths based upon criteria local to said requested data; and
  - a selection of one of the return paths in response to the negotiation, wherein the first and second agents form a single virtual agent, and wherein selection of the return path is based upon a command defining the return path, the command embedded within the received data request.

12. The article of claim 11, further comprising instructions to maintain a first log of network traffic through the computer system with the first agent, and a second log of network traffic through the second agent.

13. The article of claim 11, further comprising instructions to classify a data access request with a characteristic of the data, and to select one of the return paths based upon the classification.

14. The article of claim 13, wherein the instructions to classify the data access request includes the second agent classifying the request, including a passive request for a data request absent a security concern, and an active request for a data access request with a security concern.

15. The article of claim 11, further comprising instructions to select the optimal return communication path based upon a performance requirement.

16. A method for managing data communication in a computer system, comprising:
- splitting a return communication path from a storage device into a first path through a first agent embedded in a first computer system, and a second path direct from the storage device;
- wherein the first path communicates data through the first agent and the second path communicates data directly form the storage device;
- synchronizing the first agent and a second agent, the second agent local to the storage device, to communicate and negotiate an optimal return communication path between one of the two paths, wherein the negotiation includes combining logic of the first and second agents for providing a uniform decision between the two agents, wherein the first and second agents form a single virtual agent; and
- selecting one of the return paths in response to a command embedded within the data request defining the return path.

* * * * *